United States Patent [19]
Katoh

[11] Patent Number: 5,754,682
[45] Date of Patent: May 19, 1998

[54] PICTURE PROCESSING METHOD AND APPARATUS

[75] Inventor: Naoya Katoh, Chiba, Japan

[73] Assignee: Sony Corporation, Tokyo, Japan

[21] Appl. No.: 716,125

[22] Filed: Sep. 20, 1996

[30] Foreign Application Priority Data

Sep. 27, 1995 [JP] Japan ................................. 7-249685

[51] Int. Cl.$^6$ ........................................... G06K 9/00
[52] U.S. Cl. .......................... 382/162; 382/167; 358/518; 358/504; 348/227; 348/602
[58] Field of Search .......................... 382/162, 167; 358/518, 504; 348/227, 602

[56] References Cited

U.S. PATENT DOCUMENTS

| | | |
|---|---|---|
| 4,500,919 | 2/1985 | Schreiber ................................. 358/78 |
| 5,532,848 | 7/1996 | Beretta ................................. 358/504 |

OTHER PUBLICATIONS

Hunt, R.W.G., "Revised Colour–Appearance Model for Related and Unrelated Colours", Color Research and Application, vol. 16, No. 3, Jun. 1991.

Primary Examiner—Leo Boudreau
Assistant Examiner—Dmitry A. Novik
Attorney, Agent, or Firm—Ronald P. Kananen

[57] ABSTRACT

A picture processing apparatus in which the color appearance of a soft copy image and that of a hard copy picture coincide with each other with high precision despite difference in the optical environment. A first conversion unit 12 is responsive to the optical environmental parameters specifying a picture handled by an input device 3 to convert picture data from the input device 3 corresponding to a picture handled by the input device 3 into index data for color appearance associated with the appearance under the ambient light. A second conversion unit 14 is responsive to the optical environmental parameters specifying the luminance of the ambient light in which to observe the picture handled by the output device 4 to convert the color appearance index data obtained by the first conversion unit 12 so that the color appearance under the ambient light will be coincident with the color appearance under the ambient light under which to view the picture handled by the input device 3. The resulting appearance index data is sent to an output device 14.

10 Claims, 11 Drawing Sheets

12
PICTURE PROCESSING METHOD AND APPARATUS

BACKGROUND OF THE INVENTION

1. Field of the Invention

This invention relates to a picture processing method and apparatus for printing by a printer a picture formulated and edited as an operator views a CRT monitor in, for example, a desk top publishing (DTP) system.

2. Description of the Related Art

When transmitting picture data between various input devices, such as CRT monitors, printers, scanners or video cameras, capable of seizing or outputting pictures, and printing or displaying the picture seized or displayed on the input devices by output devices, processing by these input devices and output devices is done based on the picture data, such as RGB data or CMY(K) data, separately defined from device to device. For this reason, substantial color deviation is caused between the picture in the input device and that in the output device due to difference in characteristics of the various devices, such as filters enclosed in the devices, phosphor characteristics or ink characteristics.

There is so far known a picture processing method consisting in converting the color space of picture data defined from device to device into an intermediate color space, such as XYZ(CIE/XYZ) or L*a*b* of (CIE/L*a*b*), defined by International Commission on Illumination (CIE), for equating the color of the picture on the input device to the color of the picture on the output device on the calorimetric level (see US Patent Publication 4500919).

In converting the color space by the above-described picture processing method, there is employed the relation of association between the picture data defined from device to device and the intermediate color space associated with the picture data, known as profile, expressed as a conversion table or a conversion equation. This profile is formulated from device to device by measuring the colors of output pictures of a device, when various picture data is given such device, or by detecting the values of the picture data obtained from the device when pictures of various calorimetric values are given the device, for associating the picture data with the calorimetric values.

Since the data converted by the profile into intermediate color space is independent of the respective devices, it is termed device-independent color or device-independent data. The data is hereinafter termed device-independent color (DIC). The data defined from one device to another is termed the device-dependent color or the device-dependent data. These data are referred to hereinafter as device-dependent color (DDC).

FIG. 1 is a schematic block view showing an arrangement of a conventional picture processing system employing the abovementioned picture processing system. FIG. 2 shows the data flow in the picture processing system. In the following description, reference is had to FIGS. 1 and 2.

For example, if a scanner 43 is an input and a CRT monitor 42 and a printer 44 are output devices, the scanner 43 seizes a picture drawn on a paper sheet, and generates RGB data, as DCC, defined by the scanner 43 associated with the picture.

A picture processor 41 is a system for regenerating the same calorimetric level color by employing the above profile, that is a color management system (CMS), and is incorporated into an operating system (OS) of a computer, not shown. The picture processor 41 includes converters 411 to 413 and a matching circuit 414.

The converter 412 converts RGB data generated by the scanner 43 into XYZ data as DIC, using a profile for the scanner 43.

The mapping circuit 414 converts XYZ data, obtained on conversion by the converter 412, into data in the L*a*b* space which is the visually homogeneous space, that is L*a*b* data, by a conversion circuit 414a, and outputs the L*a*b* data to a mapping table 414d, as shown in FIG. 3.

The mapping table 414d performs compression of the gamut of the L*a*b* data from the conversion circuit 414a. That is, since all colors corresponding to the RGB data generated by the scanner 43 cannot necessarily be regenerated by the CRT monitor 42 or the printer 43, the mapping circuit 414d maps the L*a*b* data from the conversion circuit 414a, that is the colors that cannot be handled by the CRT monitor 42 or the printer 44, that is the colors that can be handled by the scanner 43 but cannot be handled by the CRT monitor 42 or the printer 44, into colors closest to the first-stated colors and which can be handled by the CRT monitor 42 or the printer 44.

To this end, the relation between the area of possible color regeneration, that is color gamut, of the scanner 43 as an input device, and the color gamut of the CRT monitor 42 and the printer 44, as output devices, is stored in the mapping table 414d. The mapping table 414d, fed with the L*a*b* data as addresses from the conversion circuit 414a, outputs L*a*b* data associated with the L*a*b* data obtained by the conversion circuit 414a, to the conversion circuit 414b or to the conversion circuit 414c.

The conversion circuit 414b or the conversion circuit 414c converts the L*a*b* data from the mapping table 414d into XYZ data as DIC.

The converter 411 converts the XYZ data, obtained on conversion by the conversion circuit 414b, into RGB data as DDC, using the pre-formed and stored profile for the CRT monitor 42, into RGB data, as DDC, and outputs the resulting RGB data to the CRT monitor 42.

The converter 413 converts the XYZ data, obtained on conversion by the conversion circuit 414c, into CMK(Y) data as DDC, using the pre-formed and stored profile for the printer 44, and outputs the resulting RGB data to the CRT monitor 42.

Thus the CRT monitor 42 displays a picture corresponding to the RGB data from the converter 411 on a screen. The printer 44 prints out an image corresponding to CMY(K) data from the converter 413 on a printing sheet.

Meanwhile, the CRT monitor 42 can be used not only as an output device but also as an input device along with the scanner 43.

Since the picture seized by the scanner 43 is outputted on the CRT monitor 42 or printed by the printer 44 in this manner, the picture displayed on the CRT monitor 42 or printed on the printing sheet by the printer 44 has the same calorimetric value as the picture seized by the scanner 43. The result is that color deviation between the picture on the input device and that on the output device can be prohibited on the colorimetric level.

If, in the above-described picture processing system, the colorimetric condition at the time of profile formulation differs from the optical environment, such as luminance, chromaticity or background of the ambient light at the time of observation of the actually seized picture, the picture printed on a printing sheet (printed picture) and the picture displayed on a CRT monitor (displayed picture), the visual sense of the viewer varies in sensitivity despite coincidence of the physical colorimetric values, thus leading to difference in the "color appearance" actually perceived by the viewer.

Since the visual sense of the viewer usually accommodates itself to the above-described optical environment, the white color appears as white color, while other colors similarly appear as such colors. That is, the visual sense of the human being relatively holds the color appearance that has prevailed under the calorimetric conditions at the time of profile formulation.

Therefore, the picture that can be observed by the reflected light of the ambient light, such as the seized or printed picture as a hard copy picture, is not changed significantly in "color appearance" even if the optical environment is changed.

Conversely, a picture displayed on a CRT monitor ar an LCD display, which are self-light-emitting devices, such as a soft copy picture that can be observed by light emission of the picture itself, differs in "color appearance" due to the difference between the white-color point, that is the brightest point of the self-light emitting device, and the chromaticity points of the ambient light, because the visual sense of the human being tends to adapt itself to both the ambient light and the while-color point of the self-light-emitting device.

That is, the difference in "color appearance" between a soft copy picture and a hard copy picture becomes outstanding in proportion to the difference between the correlative color temperature of the white point of the self-light-emitting device and the correlative color temperature of the ambient light.

Meanwhile, in the DTP system employing the picture processing system shown in FIG. 1, the CRT monitor has come to be used frequently for calibration at the time of outputting the hard copy picture.

However, if the user formulates and edits a picture outputted by a printer in consideration of color arrangement, the display picture on the CRT monitor (soft copy picture $D^S$) and the picture obtained from the printer (hard copy picture $D^H$) differ from each other, as shown in FIG. 4, because the soft copy picture and the hard copy picture differ in "color appearance" as explained above. Thus the display picture on the CRT monitor simply plays the role of a reference picture for checking the shape or size of the picture, such that the role of correcting the color arrangement or correction of a picture outputted by the printer cannot be played.

In particular, in a usual office environment, since the operation is performed under a phosphorescent light with a correlative color temperature of approximately 4150 K, the above-mentioned problem becomes more outstanding.

SUMMARY OF THE INVENTION

It is therefore an object of the present invention to provide a picture processing method and apparatus in which coincidence between the hard copy picture and the soft copy picture may be achieved with high accuracy despite difference in optical environments.

In one aspect, the present invention provides a method for processing picture data between an input device and an output device both handling pictures, in which the picture data is transmitted from the input device to the output device. The picture data corresponding to the picture handled by the input device is converted responsive to the luminance of the ambient light for observing the picture handled by the input device into index data for color appearance matching the color appearance under the ambient light, by way of performing a first conversion operation. On the other hand, the index data for color appearance is converted responsive to the luminance of the ambient light for observing the picture handled by the output device so that the color appearance under the ambient light will be coincident with the color appearance under the ambient light of observing the picture handled by the input device, by way of performing a second conversion operation. This enables high accuracy coincidence of the picture handled by the input device and that handled by the output device.

Preferably, at least one of the input device and the output device self-emits the light for a soft copy picture and outputs the soft copy picture. This enables high accuracy coincidence of a picture handled by a device self-emitting the light for the soft copy picture, that is a soft copy picture, and a picture handled by an other device.

Preferably, first conversion is correction of the contrast of the soft copy picture responsive to the reflection of the ambient light by the soft copy picture.

Preferably, first conversion is correction for chromatic adaptation of the visual sense of the human being by weighting responsive to the luminance of the ambient light.

Preferably, first conversion is correction for the Hunt effect.

With the picture processing method according to the present invention, picture data corresponding to a picture handled by the input device is converted into appearance index data corresponding to the color appearance under the ambient light responsive to the luminance of the ambient light of observing the picture handled by the input service by way of a first conversion operation. The appearance index data is converted, responsive to the luminance of the ambient light of observing the picture handled by the output device, so that the color appearance handled by the input device will be coincident with high accuracy with that of the output device despite difference in the luminance of the ambient light.

With the picture processing method according to the present invention, at least one of the input device and the output device self-emits light of the soft copy picture and outputs the resulting self-emitted light. This makes possible high accuracy coincidence of the color appearance of a picture handled by a device self-emitting and outputting a soft copy picture, that is a soft copy picture, with that of a picture handled by an other device.

With the picture processing method according to the present invention, the first conversion operation makes correction for the contrast of the soft copy picture responsive to the reflection of the ambient light on the soft copy. This makes it possible to prevent the coincidence of the color appearance of the picture handled by the input device and the picture handled by the output device from being lowered due to lowering of the contrast of the soft copy picture, thus enabling coincidence of color appearance with higher accuracy.

With the picture processing method according to the present invention, the first conversion is correction for chromatic adaptation of the visual sense of the human being by weighting responsive to the luminance of the ambient light.

With the picture processing method according to the present invention, the first conversion is correction for the Hunt effect. This makes it possible to prevent the color appearance coincidence by the Hunt effect from being lowered, thus enabling the color appearance coincidence with higher accuracy.

With the picture processing apparatus according to the present invention, the first conversion means converts the picture data corresponding to the picture handled by the input device into index data for color appearance matching the color appearance under the ambient light responsive to optical environmental parameters specifying luminance of the ambient light in which to observe the picture handled by the input device. The second conversion means converts the index data for color appearance obtained by the first conversion means responsive to the luminance of the ambient light for observing the picture handled by the output device, so that the color appearance under the ambient light will be coincident with the color appearance under the ambient light of observing the picture handled by the input device. This enables high accuracy coincidence in color appearance of the picture handled by the input device and that handled by the output device despite difference in luminance of the ambient light.

With the picture processing apparatus according to the present invention, at least one of the input device and the output device self-emits the light for a soft copy picture and outputs the soft copy picture. This enables high accuracy coincidence of a picture handled by a device self-emitting the light for the soft copy picture, that is a soft copy picture, and a picture handled by an other device.

With the picture processing apparatus according to the present invention, first conversion is correction of the contrast of the soft copy picture responsive to the reflection of the ambient light by the soft copy picture. This makes it possible to prevent the coincidence in color appearance between the picture handled by the input device and that handled by the output device from being lowered due to lowering in contrast of the soft copy picture, thus assuring higher accuracy in coincidence.

With the picture processing apparatus according to the present invention, first conversion means makes correction for chromatic adaptation of the visual sense of the human being by weighting responsive to the luminance of the ambient light. This makes it possible to prevent the coincidence in color appearance from being lowered by color adaptation of the visual sense of the human being.

With the picture processing apparatus according to the present invention, the first conversion means performs correction for the Hunt effect. This makes it possible to prevent the coincidence in color appearance from being lowered by the Hunt effect, thus enabling coincidence e of the color appearance with higher accuracy.

DESCRIPTION OF THE PREFERRED EMBODIMENTS

Figure 1:
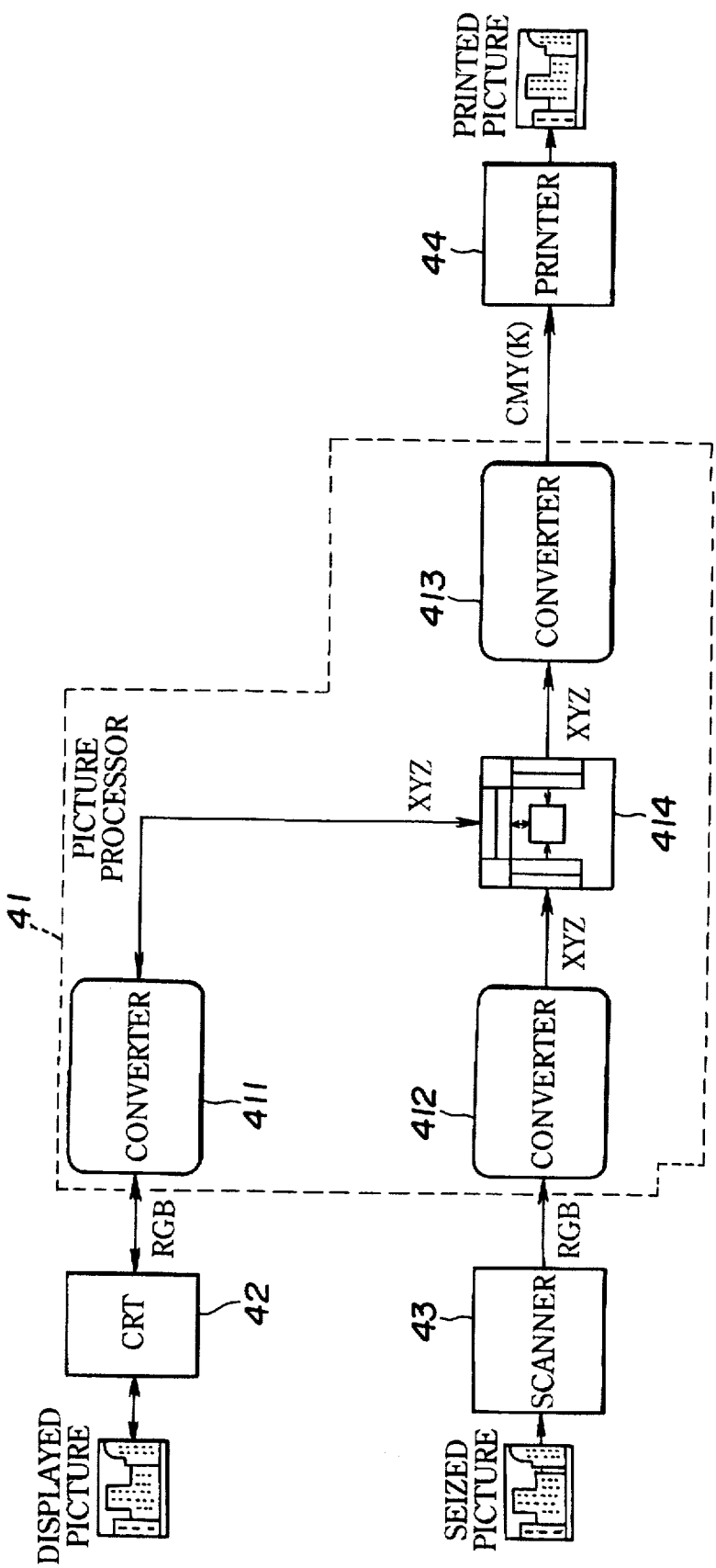
FIG. 1 is a block diagram showing an arrangement of a conventional picture processing system.
Figure 2:
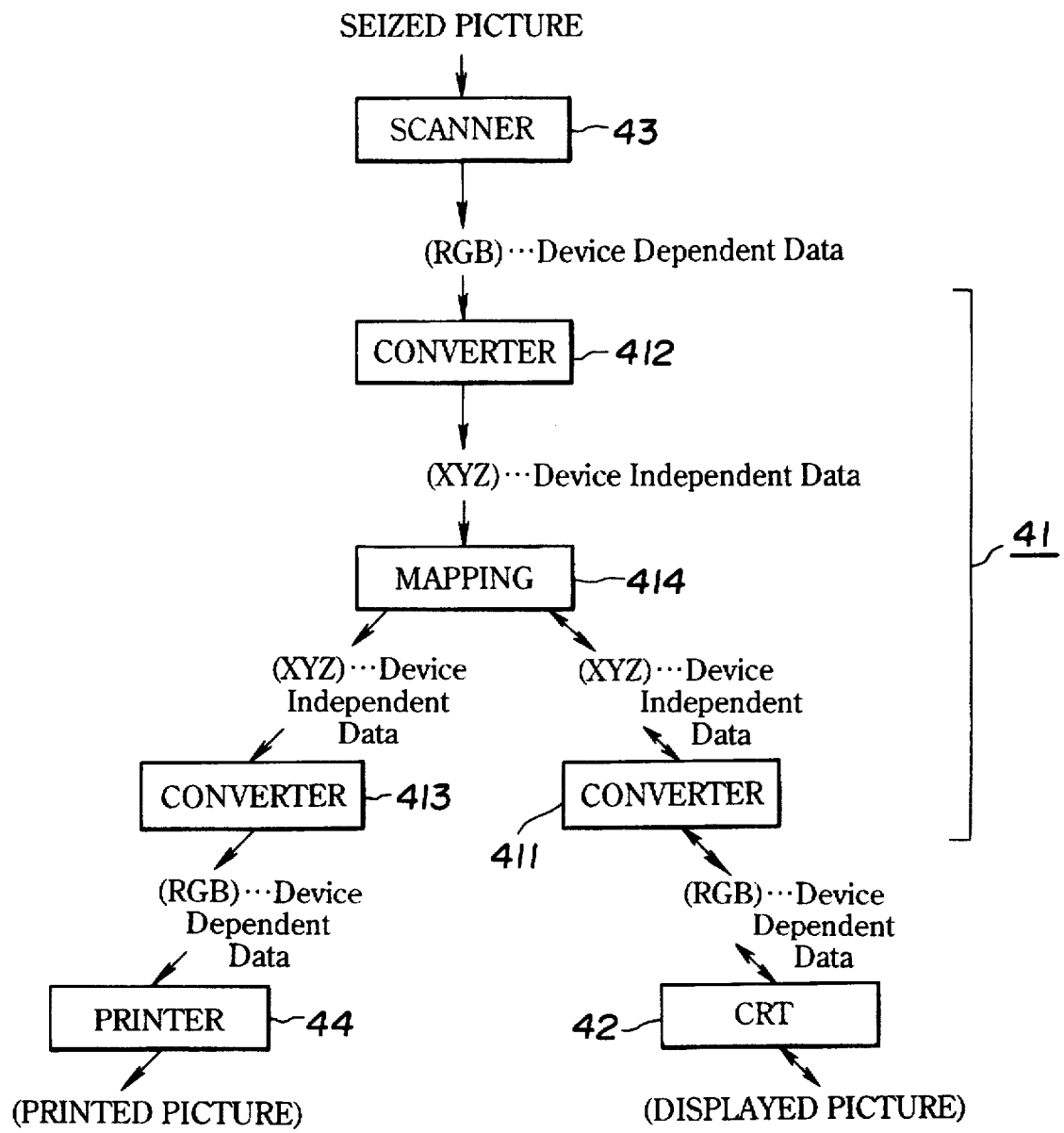
FIG. 2 illustrates flow of picture data in the picture processing system of FIG. 1.

Referring to the drawings, preferred embodiments of the present invention will be explained in detail.

Figure 5:
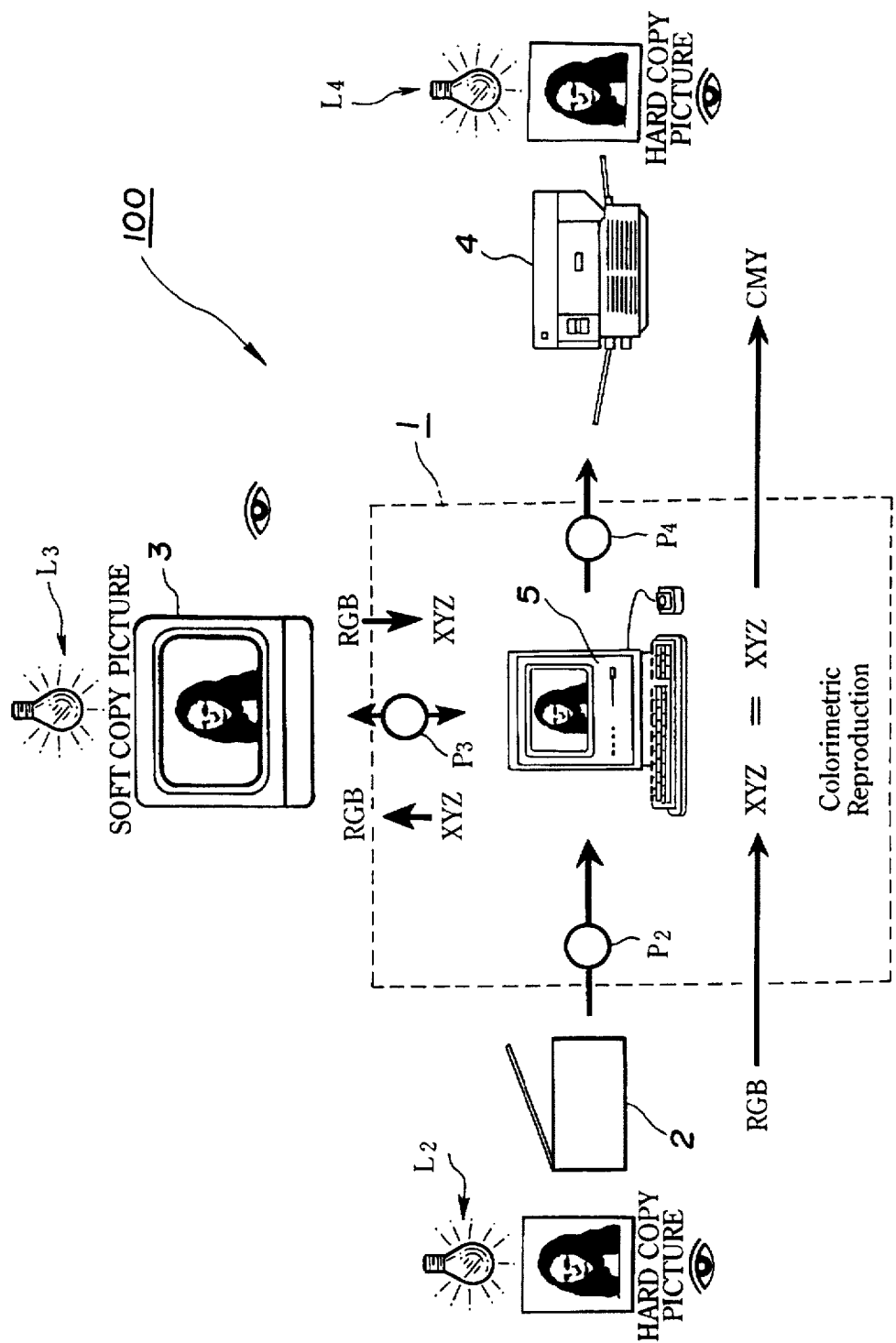
FIG. 5 is a block circuit diagram showing an arrangement of a picture processing system according to the present invention.

The picture processing method according to the present invention is carried out by a picture processing system implementing the picture processing apparatus according to the present invention, as shown for example in FIG. 5.

First, the picture processing system 100 is briefly explained.

In the present picture processing system 100, a scanner 2 and a printer 4 handling hard-copy pictures are connected by a computer 5 to a CRT monitor 3 configured for self-light-emitting a soft copy picture.

In an OS of the computer is incorporated a picture processor 1 as a color management system.

The picture processor 1 has device profiles (abbreviated simply to profiles) $P_2$, $P_3$ and $P_4$, as a group of data stating color regenerating properties. The profiles P2, P3 and P4 are formulated as a scanner, a CRT monitor 3 and as a printer, respectively.

When converting the picture data of R, G and B data defined on a scanner 2 or a CRT monitor 3 or picture data of CMY(K) data defined on the printer 4 into the intermediate color space, such as CIE/XYZ or CIE/L*a*b* color space, using the profiles P2, P3 or P4, the picture processor 1 performs picture processing, taking into account the optical environment, such as the chromaticity points of the ambient light or the white points of the CRT monitor, so that the soft copy picture obtained by the CRT monitor 3 and the hard copy picture obtained on the scanner 2 and the printer 4 will be coincident with each other in actual color appearance.

Figure 6:
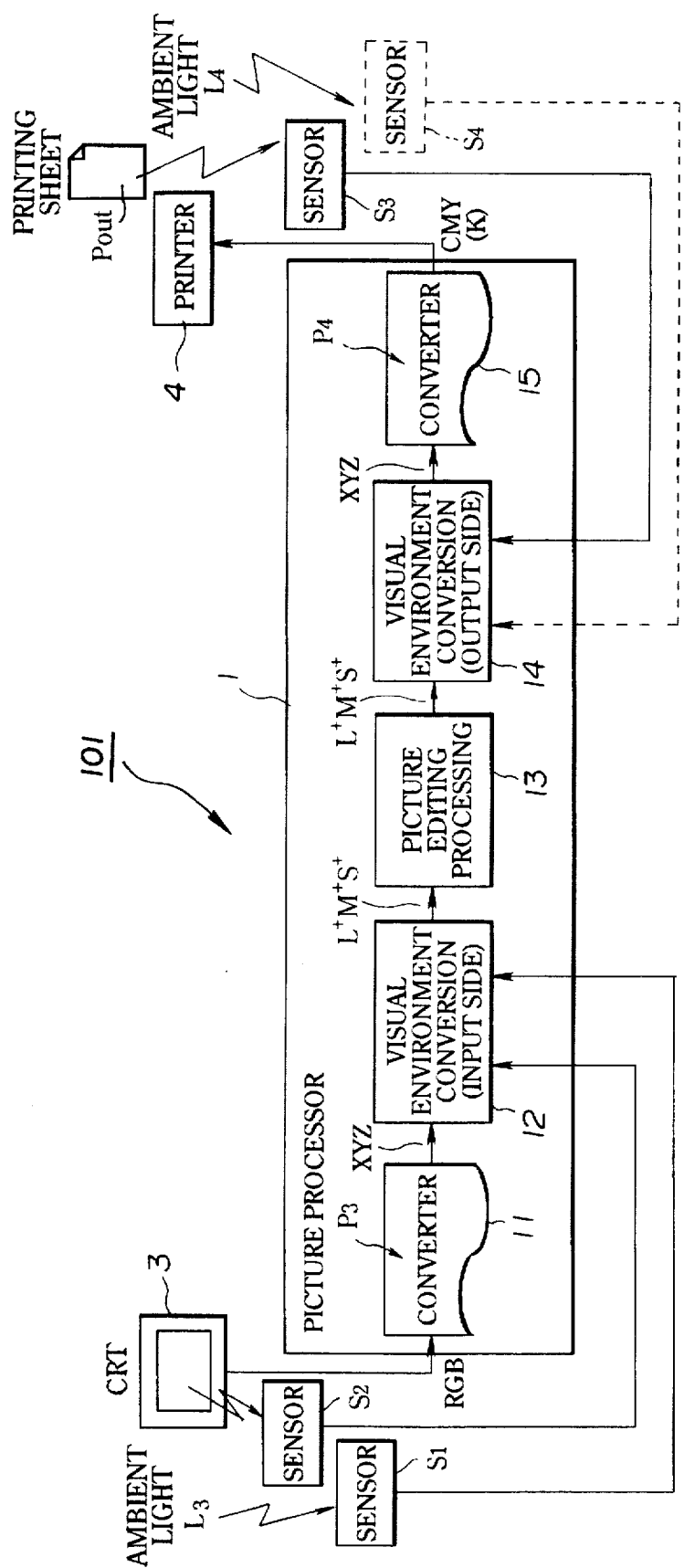
FIG. 6 is an arrangement of the picture processing system shown in FIG. 5, in which a CRT monitor is an input device and a printer is an output device.

FIG. 6 shows an illustrative arrangement of a picture processing system 100 shown in FIG. 5, in which the CRT monitor 3 is an input device and a printer 4 is an output device.

The arrangement of FIG. 6 is termed a picture processing system 101 which is now explained.

The picture processing includes a picture processor 1 supplied with picture data corresponding to the soft copy picture from the CRT monitor 3 and adapted for supplying picture data corresponding to the hard copy picture to the printer 4, and sensors $S_1$ to $S_4$ adapted for supplying the information of the optical environment to the picture processor 1.

The picture processor 1 includes a converter 11 supplied with picture data from the CRT monitor 3, an optical environment conversion circuit 12 supplied with an output of the cinverter 11 and with the information of the optical environment from the sensors $S_1$, $S_2$, and a picture editing circuit 13 fed with an output of the optical environment conversion circuit 12. The picture processor 1 also includes a an optical environment conversion circuit 14 supplied with an output of the picture editing circuit 13 and with the information on the optical environment from the sensor $S_3$ and a converter 15 supplied with an output of the optical environment conversion circuit 14 and which is adapted for supplying picture data to the printer 4.

A series of operations performed by the picture processing system is explained.

The CRT monitor 3 self-emits light for displaying the picture on a screen and routes the RGB data defined on the CRT monitor 3 as picture data corresponding to the picture to the picture processor 1.

Figure 7:
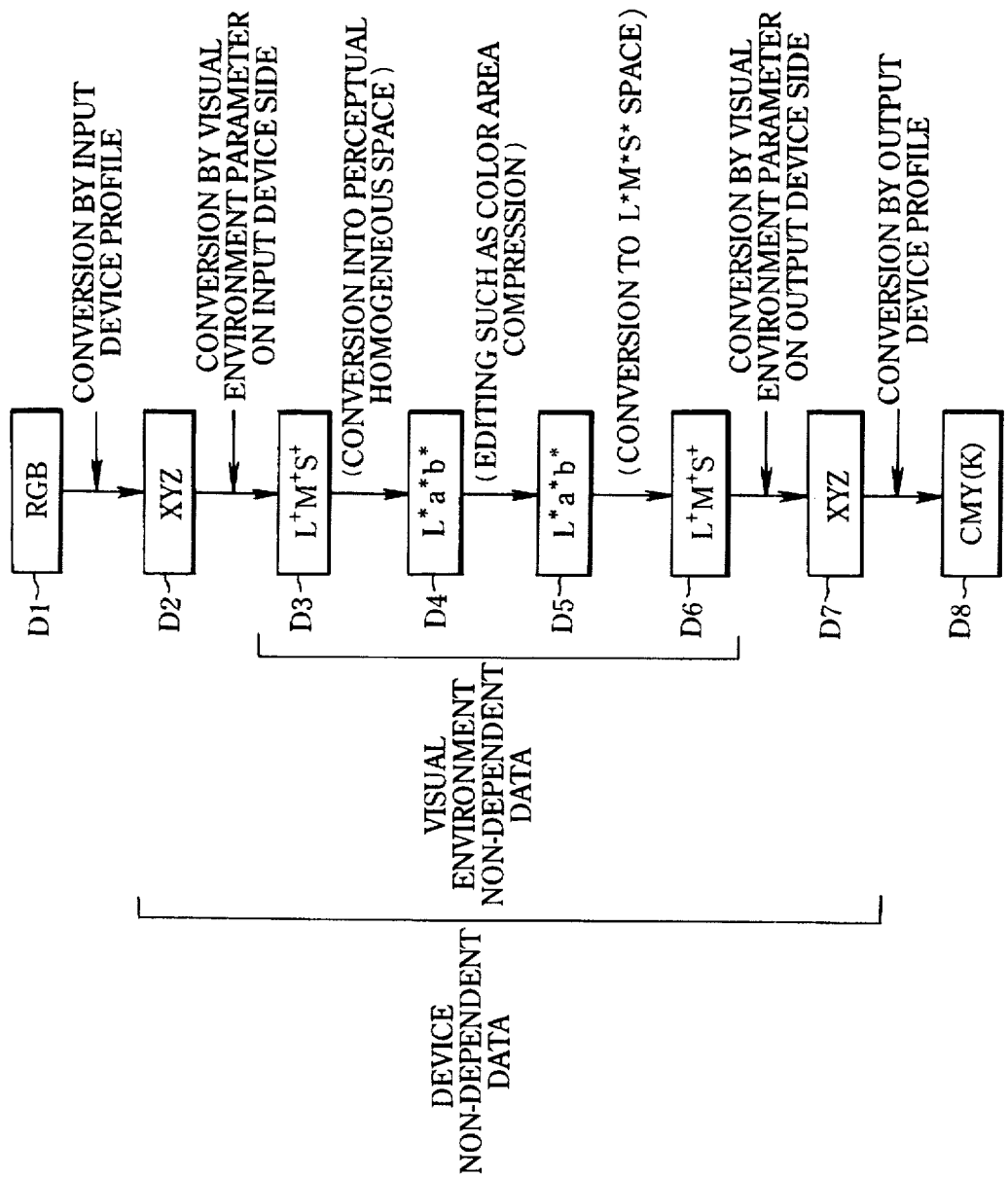
FIG. 7 is a block diagram showing the flow of picture data in a picture processor.

In the picture processor 1, the converter 11 stores the preformed profile $P_3$ for the CRT monitor 3 shown in FIG. 5. The profile $P_3$ is a statement in the form of a conversion table or a conversion equation of the relation of association between the RGB data defined on the CRT monitor 3 and the XYZ data of the color space of XYZ associated with the RGB data. The converter 11 refers to this profile $P_3$ to convert RGB data from the CRT monitor 3 into the XYZ data as DIC as shown in FIG. 7. The resulting XYZ data is supplied to the input side optical environment conversion circuit 12.

The sensors $S_1$ and $S_2$ are adapted for supplying parameters of an environment under which the user views the soft copy picture displayed on the screen of the CRT monitor 3, that is numerical figures corresponding to the optical environment of the CRT monitor.

Specifically, the sensor $S_1$ is comprised of a radiative color luminance meter and measures the values of chromaticity of the surrounding environment in which the CRT monitor 3, such as a light beam $L_3$ of a fluorescent lamp shown in FIG. 5, in order to route the measured chromaticity values to the optical environment conversion circuit 12. The sensor measures the chromaticity and absolute luminance of the white points on the CRT monitor 3 self-emitting the light and routes the measured values of chromaticity and absolute luminance of the white points as parameters of the optical environment to the optical environment conversion circuit 12.

The optical environment conversion circuit 12 is responsive to the parameters of the optical environment from the sensors $S_1$ and $S_2$ into $L^+M^+S^+$ data, which are index data corresponding to "color appearance" in the optical environment of the CRT monitor 3, in order to route the resulting data to the picture editing circuit 13, as shown in FIG. 7. The optical environment conversion circuit 12 will be explained in detail subsequently.

The picture editing circuit 13 performs picture editing, such as gamut compression or editing, on the $L^+M^+S^+$ data from the optical environment conversion circuit 12, and routes the resulting $L^+M^+S^+$ data to the output side optical environment conversion circuit 14. The picture editing circuit 13 will be explained in detail subsequently.

Similarly to the sensors $S_1$, $S_2$, the sensor $S_3$ is adapted for routing to the optical environment conversion circuit 14 the environmental parameters of the optical environment under which the user observes the hard copy picture, which is a picture printed by the printer 4 on a printing sheet $P_{out}$. The above environment is such environment under which the user views the picture.

The optical environment conversion circuit 14 is responsive to the parameters of the optical environment from the sensor $S_3$ to convert the $L^+M^+S^+$ data from the picture processing circuit 13 into XYZ data as the DIC data, so that the "color appearance" under the optical environment of the printer 4 will be coincident with the "color appearance" under the optical environment of the CRT monitor 3. The optical environment conversion circuit 14 will be explained subsequently.

Similarly to the converter 11, the converter 15 stores a preformed profile $P_4$ shown in FIG. 5. The profile $P_4$ states the relation of association between the CMY(K) data defined by the printer 4 and the XYZ data of the color space of XYZ associated with the CMY(K) data in the form of a conversion table or a conversion formula. The converter 15 has reference to this profile $P_4$ for converting the XYZ data from the optical environment conversion circuit 14 into the CMY (K) data as DDC of the printer 3 and routes the resulting data to the printer 4.

In this manner, a hard copy picture coincident in "color appearance" to the soft copy picture displayed on the CRT monitor 3 is printed on the printing sheet $P_{out}$.

The method for formulating the profiles $P_3$ and $P_4$, stored in the converters 11, 15, respectively, will be explained.

For formulating the profile for the CRT monitor 3, normalized data rgb of the RGB data outputted by the CRT monitor 3 is first calculated.

That is, if the R, G and B data outputted by the CRT monitor 3 are expressed by 8-bit data dr, db and dg, respectively, the values of the R, G and B in the white points of the CRT monitor 3 are expressed as $R_{max}$, $G_{max}$ and $B_{max}$, respectively, the gains of R, G and B are expressed as $k_{r,gain}$, $k_{g,gain}$, $k_{b,gain}$, respectively, the offsets of R, G and B are expressed as $k_{r,offset}$, $k_{g,offset}$ and $k_{b,offset}$, respectively, and coefficients for gamma correction of R, G and B in association with characteristics of the CRT monitor 3 (gamma correction coefficients) are expressed as $\gamma_r$, $\gamma_g$, $\gamma_b$, respectively, the rgb data normalized from the RGB data outputted by the CRT monitor 3 are calculated by equations (1):

$$r = \frac{R}{R_{max}} = (k_{r,gain}(dr/255) + k_{r,offset})^{\gamma_r}$$

$$g = \frac{G}{G_{max}} = (k_{r,gain}(dg/255) + k_{g,offset})^{\gamma_g}$$

$$b = \frac{B}{B_{max}} = (k_{b,gain}(db/255) + k_{b,offset})^{\gamma_b}$$

The numerical figure 255 in the above equations (1) are values corresponding to the RGB data outputted by the CRT monitor 3. If the RGB data is n bits, the numerical figure is represented by $2^n-1$. Since the RGB data is 8 bits, $2^8-1=255$.

The XYZ data is then calculated, using the rgb data calculated by the equations (1), by linear transformation in accordance with the following equations (2):

$$\begin{vmatrix} X \\ Y \\ Z \end{vmatrix} = \begin{vmatrix} X_{R,max}, & X_{G,max}, & X_{B,max} \\ Y_{R,max}, & Y_{G,max}, & Y_{B,max} \\ Z_{R,max}, & Z_{G,max}, & Z_{B,max} \end{vmatrix} \begin{vmatrix} r \\ g \\ b \end{vmatrix} \quad (2)$$

The matrix of the right side of the equation (2) is calculated using for example, the least square method.

By way of correcting the contrast of the soft copy picture displayed on the CRT monitor 3 and the hard copy picture printed by the printer 4 on the print sheet $P_{out}$, the reflected light of the ambient light on the tube surface of the CRT monitor 3 is added to the XYZ data calculated by the equation (2).

Specifically, if the luminance of the ambient light of the environment, in which is mounted the CRT monitor 3, is increased, the soft copy picture displayed on the CRT monitor 3 is lowered in contrast. It is because the black point, that is the darkest point, becomes "floated" due to reflection of the ambient light to the tube surface of the CRT monitor 3. Although an anti-reflection film is deposited in general on the CRT monitor, the black color regenerated on the CRT monitor cannot be made darker than the reflected light as long as the ambient light exists. Therefore, since the visual sense of the human being is sensitive to the dark color, the picture is lowered in contrast if the black color becomes "floated".

For taking the above phenomenon into consideration, (X'Y'Z') (CRT) data taking into account the reflected light is calculated from the XYZ data calculated from the equation (2), referred to hereinafter as $(XYZ)_{(CRT)}$ data, in accordance with the following equation (3):

$$X'_{(CRT)} = X_{(CRT)} + R_{bk} * X_{(Ambient)}$$

$$Y'_{(CRT)} = Y_{(CRT)} + R_{bk} * Y_{(Ambient)}$$

$$Z'_{(CRT)} = Z_{(CRT)} + R_{bk} * Z_{(Ambient)} \quad (3)$$

where $R_{bk}$ is the reflectance on the tube surface of the CRT monitor 3, which is usually on the order of 1 to 5% and $X_{(Ambient)}$, $Y_{(Ambient)}$, $Z_{(Ambient)}$ are the (XYZ) ambient data by the ambient light. By the above equation (3), the reflection of the ambient light is added as offset to the light emitted by the CRT monitor 3 in order to cope with the lowering in contrast as described above.

After adding the refection of the ambient light by the equation (3), the data is normalized so that the maximum value of $Y'_{(CRT)}$ will be equal to 100.

Thus the profile $P_3$ for the CRT monitor 3 is formulated by stating the relation of association of the $(X'Y'Z')_{(CRT)}$ data in the equations (3) with dr, dg, db in the equation (1) in a table format.

For forming the profile P4 for the printer 4, the values of the CMY(K) data are varied and entered to the printer 4 and measurement is made of the resulting hard copy picture. The profile $P_4$ of the printer 4 is formulated by stating the relation of association between the values obtained on colorimetry and the input CMY(K) data in the form of a conversion table.

An area of the gamut by the XYZ data not covered by the printer 4 is associated with an area in the gamut that can be represented by the printer 4.

The above-described input-side optical environment conversion circuit 12 is now explained.

The optical environment conversion circuit 12 first converts the XYZ data from the converter 11, that is XYZ data from the converter 11, that is the $(X'Y'Z')_{(CRT)}$ data obtained by the equation (3), into LMS data associated with the signal of the cones of the eye of the human being, that is into data of the LMS space, by the following equation (4):

$$\begin{vmatrix} L_{(CRT)} \\ M_{(CRT)} \\ S_{(CRT)} \end{vmatrix} = \begin{vmatrix} 0.3871 & 0.68898 & -0.07868 \\ -0.22981 & 1.18340 & 0.04641 \\ 0.0 & 0.0 & 1.0 \end{vmatrix} \begin{vmatrix} X_{(CRT)} \\ Y_{(CRT)} \\ Z_{(CRT)} \end{vmatrix}_E \quad (4)$$

It should be noted that the matrix on the right side of the equation is a known matrix as found by a visual sense test. The matrix is described in CCC 0361-2317/91/030146-20$4.00, COLOR research and application (vol.16, number 3, June 1991, Revised Color Appearance for Related and Unrelated Colors).

The equation (4) uses a Hunt-Pointer-Esteves transform. The matrix for conversion into the signal of the cones of the human being is, however, not limited to the matrix of the right side of the equation (4). The equation (4) is an example of conversion equations for conversion into the $(X'Y'Z')_{(CRT)}$ data having flat spectral distribution into the signal of the cones of the human being.

The L, M and S data obtained from the equation (4) are associated with signals of the long, mid and short wavelengths among the signals of the cones of the human being.

Color adaptation by the surrounding optical environment is corrected by processing for incomplete adaptation and by processing for partial adaptation.

With the visual sense of the human being, the sensitivity of each cone is varied in order to make the light source white in color as in the case of white balance in a video camera. Thus the signals of the cones are normalized with the values of the white points of the cones. Basically, the adaptation rule of von Kries is used. However, the values of chromaticity of the light source are not directly used for the white points to which the visual sense of the human being presumably adapts itself. On the contrary, color adaptation by the surrounding environment is corrected by carrying out processing associated with the incomplete adaptation and processing with the partial adaptation.

As a first operational step, processing for incomplete adaptation is carried out. The incomplete adaptation means that, when the observer views a picture displayed on the CRT monitor 3, the visual sense of the human being tries to adapt itself to the white point on the CRT monitor, however, if the CRT monitor 3 is viewed in a dark room and the chromaticity of the white point on the monitor 3 substantially deviates from the light of D56, the visual sense of the human being cannot adapt itself to the white point on the CRT monitor. That is, the further the chromaticity of the white point of the CRT monitor 3 from the light of D65 or E, and the lower the luminance of the point of adaptation, the more incomplete becomes the adaptation.

Using the LMS data (L, M, S) obtained from the equations (1) to (4) from the RGB data (R, G, B) in the white point of the CRT monitor 3, the (L', M', S')$_{n(CRT)}$ data (L'$_{n(CRT)}$, M'$_{n(CRT)}$, S'$_{n(CRT)}$, which are incompletely adaptive white points to which the visual sense of the human being adapts itself, is found.

If the LMS data (L, M, S) obtained from the equations (1) to (4), is represented by (LMS)$_{n(CRT)}$ data (L$_{n(CRT)}$, M$_{n(CRT)}$, S$_{n(CRT)}$ and the color adaptive correction coefficients as later explained are $P_L$, $P_M$, $P_S$, the (L', M', S')$_{n(CRT)}$ data (L'$_{n(CRT)}$, M'$_{n(CRT)}$, S'$_{n(CRT)}$ may be represented by the following equations (5):

$$L'_{n(CRT)} = L_{n(CRT)}/P_L$$

$$M'_{n(CRT)} = M_{n(CRT)}/P_M$$

$$S'_{n(CRT)} = C_{n(CRT)}/P_S \quad (5)$$

Thus the visual sense of the human being adapts itself to, as it were, a pseudo white point, having the chromaticity values of $(L'_{n(CRT)}, M'_{n(CRT)}, S'_{n(CRT)})$ indicated by the equation (5).

In the equation (5), the chromatic adaptive factors $P_L$, $P_M$, $P_S$ are those used in a Hunt's model and may be found by the following equations (6):

$$P_L = \frac{(1 + Y_{mon}^{1/3} + l_E)}{(1 + Y_{mon}^{1/3} + 1/l_E)} \quad (6)$$

$$P_M = \frac{(1 + Y_{mon}^{1/3} + m_E)}{(1 + Y_{mon}^{1/3} + 1/m_E)}$$

$$P_S = \frac{(1 + Y_{mon}^{1/3} + S_E)}{(1 + Y_{mon}^{1/3} + 1/S_E)}$$

The following Table 1 shows examples of values of the chromatic adaptive factors $P_L$, $P_M$, $P_S$ of the actual color monitor 3. In Table 1, the correlated color temperature CCT denotes the correlative color temperature of the CRT monitor 3. Specifically, Table 1 shows the values of the chromatic adaptation factors $P_L$, $P_M$, $P_S$ for the CCT of the CRT monitor equal to about 9000 K and about 6500 K.

TABLE 1

| monitors | CCT | ($P_L$, $P_M$, $P_S$) |
|---|---|---|
| monitor A | ≃9000K | (0.9493, 0.9740, 1.0678) |
| monitor B | ≃6500K | (0.9849, 0.9920, 1.0222) |

In the equation (5), the above domains $l_E$, $m_E$, $s_E$ are defined by the equations (7):

$$l_E = 3 \cdot L_{n(CRT)}/(L_{n(CRT)} + M_{n(CRT)} + S_{n(CRT)})$$

$$m_E = 3 \cdot M_{n(CRT)}/(L_{n(CRT)} + M_{n(CRT)} + S_{n(CRT)})$$

$$s_E = 3 \cdot S_{n(CRT)}/(L_{n(CRT)} + M_{n(CRT)} + S_{n(CRT)}) \quad (7)$$

Then, as second step processing, processing corresponding to partial adaptation is carried out. Explaining the partial adaptation, if a picture displayed on the screen of the CRT monitor 3 is observed, it is observed in a dark room only rarely. In most cases, the picture is observed in a place where there is an ambient light from a lit phosphorescent tube having the CCT of approximately 4150K, for example, in a usual office. In most cases, the CCT of the white point of a computer graphic monitor generally used as the CRT monitor 3 is approximately 9300 K. If the CCT of the white point of the CRT monitor 3 significantly differs from that of the ambient light, the visual sense of the human being tries to adapt itself to the white point of the ambient light and the pseudo white point of the CRT monitor 3 having the chromaticity values of $(L'_{n(CRT)}, M'_{n(CRT)}, S'_{n(CRT)})$ represented by the equation (5). This phenomenon is termed partial adaptation. If, for example, the computer graphic monitor is used as the CRT monitor 3, the adaptive ratio of the visual sense of the human being is about 60 to 40% for the monitor and about 40 to 60% for the ambient light.

Assuming that the white point to which the visual sense of the human being adapts itself is intermediate between the abovementioned pseudo white point and the white point of the ambient light, the data $(L', M', S')_{n(CRT)}$ data $(L''_{n(CRT)}, M''_{n(CRT)}, S''_{n(CRT)})$, to which the visual sense of the human being adapts itself, is found.

Specifically, using the $(L', M', S')_{n(CRT)}$ data $(L'_{(CRT)}, M'_{n(CRT)}, S'_{n(CRT)})$, represented by the equation (5), the $(L'', M'', S'')_{n(CRT)}$ data $(L''_{n(CRT)}, M''_{n(CRT)}, S''_{n(CRT)})$ defined by the following equations (8):

$$L''_{n(CRT)} = R_{adp} \cdot (Y_{mon}/Y_{adp})^{1/3} \cdot L'_{n(CRT)} + (1-R_{adp}) \cdot (Y_{sur}/Y_{adp})^{1/3} \cdot L_{n(Ambient)}$$

$$M''_{n(CRT)} = R_{adp} \cdot (Y_{mon}/Y_{adp})^{1/3} \cdot M'_{n(CRT)} + (1-R_{adp}) \cdot (Y_{sur}/Y_{adp})^{1/3} \cdot M_{n(Ambient)}$$

$$S''_{n(CRT)} = R_{adp} \cdot (Y_{mon}/Y_{adp})^{1/3} \cdot S'_{n(CRT)} + (1-R_{adp}) \cdot (Y_{sur}/Y_{adp})^{1/3} \cdot S_{n(Ambient)}$$

where $L_{n(Ambient)}$, $M_{n(Ambient)}$ and $S_{n(Ambient)}$ denote chromaticity values at the white point of the ambient light, $R_{adp}$ denotes the ratio of adaptation by which the visual sense of the human being adapts itself to the white color point of the CRT monitor 3 (referred to hereinafter as the adaptation factor), $Y_{sur}$ denotes the absolute luminance with which the ambient light is reflected from an output sheet, such as the printing sheet $P_{out}$, and $Y_{adp}$ is as now defined.

In the equations (8), $Y_{adp}$ is defined by the following equation (9):

$$Y_{adp} = (R_{adp} \cdot Y_{mon}^{1/3} + (1-R_{adp}) \cdot Y_{sur}^{1/3})^3 \quad (9)$$

Explaining the adaptation factor $R_{adp}$ more specifically, the adaptation factor $R_{adp}$ is a coefficient representing the "ratio of adaptation" by which the visual sense of the human being adapts itself to the pseudo white point of the CRT monitor 3 and to the white point of the ambient light. It is previously set to a value ranging from 0.0 to 1.0.

Therefore, if the adaptive ratio coefficient $R_{adp}$ is 1.0, the visual sense of the human being adapts itself by 100% to the CRT monitor 3, while not being affected by the ambient light. This is conceptually equivalent to matching to the setting of the CIE/L*a*b*. If the adaptive ratio coefficient $R_{adp}$ is 0.0, the visual sense of the human being adapts itself by 100% to the ambient light, while not being affected by the CRT monitor 3. In addition, since the luminance of the CRT monitor 3 differs from that of the ambient light, the weighting coefficients, $(Y_{mon}/Y_{adp})^{1/3}$ and $(Y_{sur}/Y_{adp})^{1/3}$ are introduced. The weighting coefficient becomes equal to 1 if the luminance of the CRT monitor 3 is of approximately the same level as that of the ambient light.

The optical environment conversion circuit 12 is fed with the actual values of chromaticity $L_{n(CRT)}$, $M_{n(CRT)}$ and $S_{n(CRT)}$ of the white point of the CRT monitor 3 in the equations (5) to (7) and the value of the absolute luminance $Y_n$, as optical environment parameters, from the sensor $S_2$, while being fed with the values of chromaticity $L_{n(Ambient)}$, $M_{n(Ambient)}$ and $S_{n(Ambient)}$ of the white point of the equation (8). Thus, by carrying out the calculations of the equations (5) to (8) using the optical environment parameters from the sensors $S_2$ and the sensor $S_1$, the values of chromaticity $L''_{n(CRT)}$, $M''_{n(CRT)}$, $S''_{n(CRT)}$, to which the visual sense of the human being actually adapts itself when observing the image displayed on the CRT monitor 3 in the presence of the ambient light, may be found.

The data converted corresponding to the LMS data (L, M, S) obtained by the equation (4), that is the RGB data (R, G, B) supplied from the CRT monitor 3, converted into the signal for the cones of the human being, is divided by the chromaticity values $(L'', M'', S'')_{n(CRT)}$ data $(L''_{n(CRT)}, M''_{n(CRT)}, S''_{n(CRT)})$ of the adaptive white points found as described above to find $L^+M^+S^+$ data $(L^+, M^+, S^+)$ which are as it were the appearance index data reflecting the "color appearance" on observation of the soft copy picture displayed on the CRT monitor 3.

Specifically, by substituting the chromaticity values (L", M", S")$_{n(CRT)}$ data (L"$_{n(CRT)}$, M"$_{n(CRT)}$, S"$_{n(CRT)}$) of the adaptive white point into the Von Kries adaptation rule as indicated by the following equations (10):

$$L'_{(CRT)} = L_{(CRT)}/L"_{n(CRT)}$$

$$M'_{(CRT)} = M_{(CRT)}/M"_{n(CRT)}$$

$$S'_{(CRT)} = S_{(CRT)}/S"_{n(CRT)}$$

L⁺M⁺S⁺ data (L⁺, M⁺, S⁺) are found.

After correcting the chromatic adaptation with the surrounding optical environment by the processing corresponding to the incomplete adaptation and partial adaptation, as described above, the correction operation with respect to the Hunt effect is carried out.

The Hunt effect is such a phenomenon proper to the visual sense of the human being in which, the higher the luminance, the higher is the apparent perceived colorfulness, that is that the same color appears to the human being as being brighter the higher becomes the ambient luminance, such that $$G_{CRT} = \begin{vmatrix} 1 & C & C \\ C & 1 & C \\ C & C & 1 \end{vmatrix}$$

In the above equation (11), C may be found by an equation (12):

$$C = 0.219 - 0.0784 \log_{10}(Y_{mon}) \quad (12)$$

That is, the L⁺M⁺S⁺ data (L⁺, M⁺, S⁺) obtained by the above equation (10) is multiplied with a matrix represented by the equation (11) to make corrections for the Hunt effect, as shown by the equation (13):

$$\begin{vmatrix} L^+ \\ M^+ \\ S^+ \end{vmatrix} = G_{CRT} \begin{vmatrix} L'_{CRT} \\ M'_{CRT} \\ S'_{CRT} \end{vmatrix} \quad (13)$$

The L⁺M⁺S⁺ data, thus corrected for the Hunt effect by the equation (13), is sent to the picture editing circuit 13.

The above refers to the optical environment conversion circuit 12.

The picture editing circuit 13 is now explained.

The picture editing circuit 13 converts the L⁺M⁺S⁺ data (L⁺, M⁺, S⁺), which are appearance index data from the optical environment conversion circuit 12, into data of the L*a*b* space, which is a visually homogeneous space, in accordance with the following equation (14):

$$\begin{vmatrix} X^* \\ Y^* \\ Z^* \end{vmatrix} = 100 \cdot \begin{vmatrix} 1.91020 & -1.11212 & 0.21990 \\ 0.37095 & 0.62905 & 0.0 \\ 0.0 & 0.0 & 1.0 \end{vmatrix} \begin{vmatrix} L^+ \\ M^+ \\ S^+ \end{vmatrix}$$

where $$L^* = 116 \cdot (Y^*/Y0^*)^{1/3} - 16, \text{ with } Y^*/Y0^* \geq 0.00856$$

$$a^* = 500 \cdot (X^*/X0^*)^{1/3} - (Y^*/Y0^*)^{1/3}$$

with $$X^*/X0^* \geq 0.00856$$

and $$Y^*/Y0^* \geq 0.00856$$

and $$b^* = 200 \cdot (Y^*/Y0^*)^{1/3} - (Z^*/Z0^*)^{1/3}$$

with $$Y^*/Y0^* \geq 0.00856$$

and $$Z^*/Z0^* \geq 0.00856 \quad (14)$$

In the above equation (14), $X_0^*$, $Y_0^*$, $Z_0^*$ are values of L⁺, M⁺, S⁺ at the white point of the L⁺M⁺S⁺ data.

In the above equation (14), $X_0^*$, $Y_0^*$, $Z_0^*$ are the values of X*, Y*, Z* at the white points. In this case, these values are each "100".

The picture editing circuit 13 then performs picture editing operations, such as pre-set gamut compression or color editing, on the data of the L*a*b* space on the visually homogeneous space obtained by the equation (14).

After end of the picture editing operations, the picture editing circuit 13 converts the data of the L*a*b* space into L⁺M⁺S⁺ data (L⁺, M⁺, S⁺), which are data of the original space, based on the above equation (14), and routes the converted data to the output-side optical environment conversion circuit 14.

The output-side optical environment conversion circuit 14 is now explained.

The optical environment conversion circuit 14 is fed from the sensor S₃ with the chromaticity values $L_{n(PRN)}$, $M_{n(PRN)}$, $S_{n(PRN)}$ of the white point of the printing sheet $P_{out}$ on which to print the picture by the printer 4, as the optical environmental parameters. These chromaticity values $L_{n(PRN)}$, $M_{n(PRN)}$, $S_{n(PRN)}$ of the white point of the printing sheet $P_{out}$ represent the chromaticity values $L_{n(Hardcopy)}$, $M_{n(Hardcopy)}$ and $S_{n(HardCopy)}$ to which the visual sense of the viewer adapts itself when he or she views the hardcopy picture printed on the printing sheet $P_{out}$.

If the CMK(Y) data, which are picture data corresponding to a hard copy picture by the printer 4, is converted by the profile P₄ for the printer 4 stored in the converter 15, and the resulting XYZ data is converted by the above equation (4) into the LMS data, the data reflecting the "color appearance" when the viewer views the hardcopy picture prepared by the printer 4 become $L/L_{n(Hardcopy)}$, $M/M_{n(Hardcopy)}$ and $S/S_{n(HardCopy)}$.

Since the optical environment conversion circuit 12 performs picture processing inclusive of contrast correction taking into account the light reelection on the tube surface of the CRT monitor 3 or correction for chromatic adaptation of the visual sense of the human being in case of changes in the luminance of the ambient light, it suffices if the relation represented by the following equation (15):

$$\begin{vmatrix} L^+ \\ M^+ \\ S^+ \end{vmatrix} = G_{(CRT)} \begin{vmatrix} L_{(CRT)}/L"_{n(CRT)} \\ M_{(CRT)}/M"_{n(CRT)} \\ S_{n(CRT)}/S"_{n(CRT)} \end{vmatrix} \quad (15)$$

$$= G_{(HardCopy)} \begin{vmatrix} L_{(HardCopy)}/L_{n(HardCopy)} \\ M_{HardCopy}/M_{n(HardCopy)} \\ S_{HardCopy}/S_{n(HardCopy)} \end{vmatrix}$$

is met in order for the soft-copy picture to be coincident in "color appearance" with the hardcopy picture.

Thus the $L^+$, $M^+$, $S^+$ data $(L^+, M^+, S^+)$ supplied from the optical environment conversion circuit 12 via the picture editing circuit 13 to the optical environment conversion circuit 14 in accordance with the equations (13) and (15) are converted by the following equation (16):

$$\begin{vmatrix} L_{HardCopy} \\ M_{HardCopy} \\ S_{HardCopy} \end{vmatrix} = \begin{vmatrix} L_{n(HardCopy)} & 0 & 0 \\ 0 & M_{n(HardCopy)} & 0 \\ 0 & 0 & S_{n(HardCopy)} \end{vmatrix} \quad (16)$$

for producing LMS data.

The LMS data calculated by the equation (16) is transformed by linear transformation by the inverse matrix of the matrix on the right side of the equation (4) in order to find XYZ data as DIC. The XYZ data thus found is supplied to the converter 15.

Figure 3:
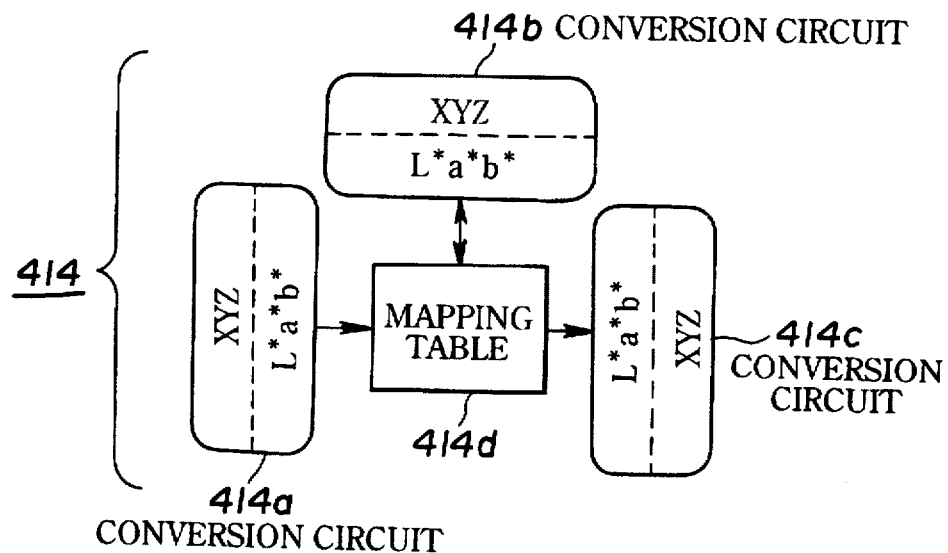
FIG. 3 illustrates an arrangement of a mapping circuit.
Figure 4:
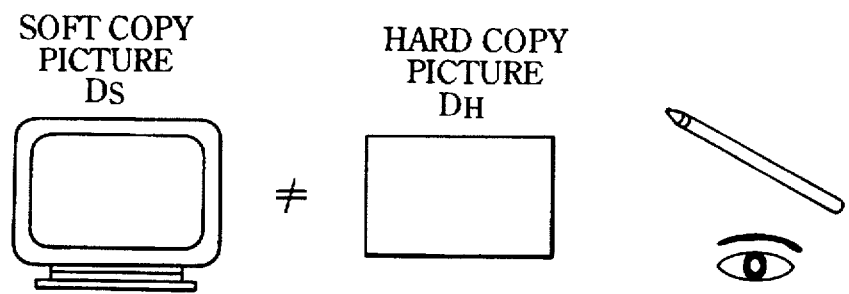
FIG. 4 illustrates difference in color appearance.

Referring to FIG. 3, the flow of picture data in the picture processor 1 having the above-described circuits, namely the optical environment conversion circuit 12, picture editing circuit 13 and the optical environment conversion circuit 14 is explained in detail.

The picture processing circuit 101 prints a hard copy picture on the printing sheet $P_{out}$ by the printer 4 from an original, that is the soft copy picture displayed on the CRT monitor 3.

As a flow of picture data, the RGB data (D1) corresponding to the soft-copy picture displayed on the CRT monitor 3 is converted by the profile $P_3$ for the CRT monitor 3 stored in the computer 11 into ZYX data (D2) of CIE/XYZ which is the device independent color space.

The device independent XYZ data (D2) is then converted into $L^+M^+S^+$ data, which are the appearance index data, based on variables of an environment in which the soft copy picture of the CRT monitor 3 is actually observed, that is the optical environmental parameters outputted by the sensors $S_1$ and $S_2$.

The $L^+M^+S^+$ data are then converted into $L^*a^*b^*$ data (D4) of the (CIE/$L^*a^*b^*$) space, which is the perceptually homogeneous space, and picture processing operations, such as gamut compression or color editing, are performed as appropriate on the converted data. The $L^*a^*b^*$ data, thus processed, become $L^*a^*b^*$ data (D5).

The $L^*a^*b^*$ data (D5) is then converted into $L^+M^+S^+$ data (D6) which represents the $L^+M^+S^+$ space data.

The $L^*a^*b^*$ data (D6) is then restored to XYZ data (D7) of CIE/XYZ, based on the variables of the environment in which the hard copy picture outputted by the printer 4 is observed, that is the optical environmental parameters outputted by the sensor $S_3$.

The XYZ data D7 is converted by the profile $P_4$ for the printer 4 stored in the converter 15 into the CMY(K) data (D8) defined by the printer 4. The converted data is outputted by the printer 4.

The relation between the adaptation factor $R_{adp}$ in the equation (8) and the coincidence of actual "color appearance" of the soft copy picture and the hard copy picture is now explained.

Figure 8:
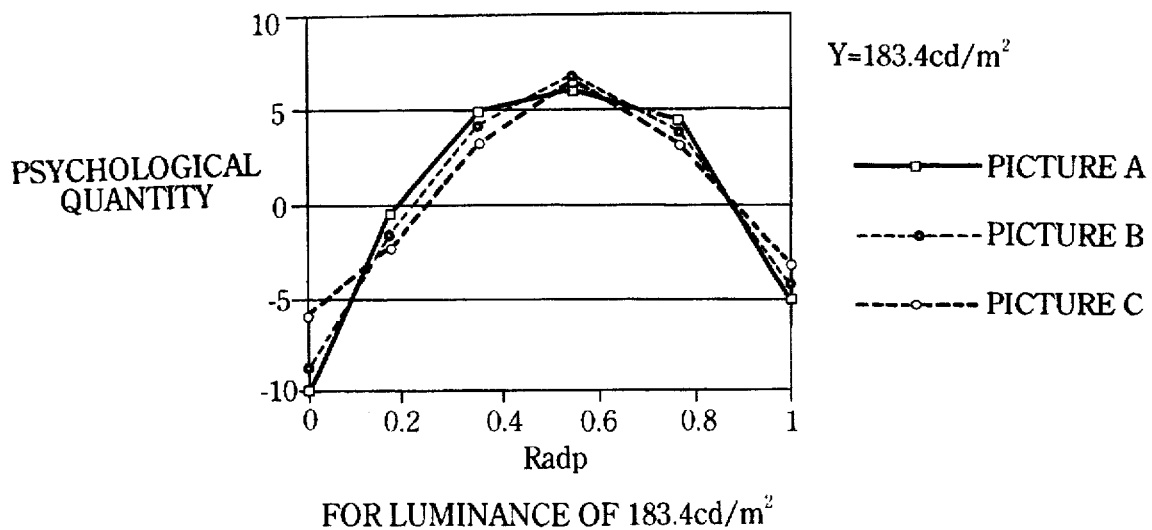
FIG. 8 illustrates the relation between an adaptive ratio coefficient and the psychological quantity of the viewer in case the CRT monitor differs from the ambient light in luminance of 183.4 cd/m$^2$.
Figure 9:
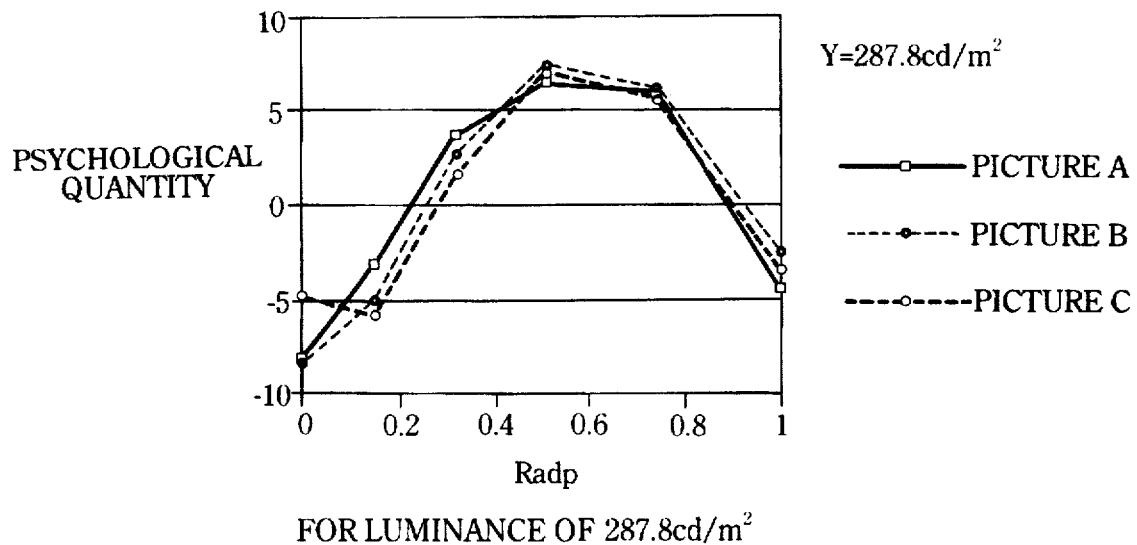
FIG. 9 illustrates the relation between an adaptive ratio coefficient and the psychological quantity of the viewer in case the CRT monitor differs from the ambient light in luminance of 278.8 cd/m$^2$.
Figure 10:
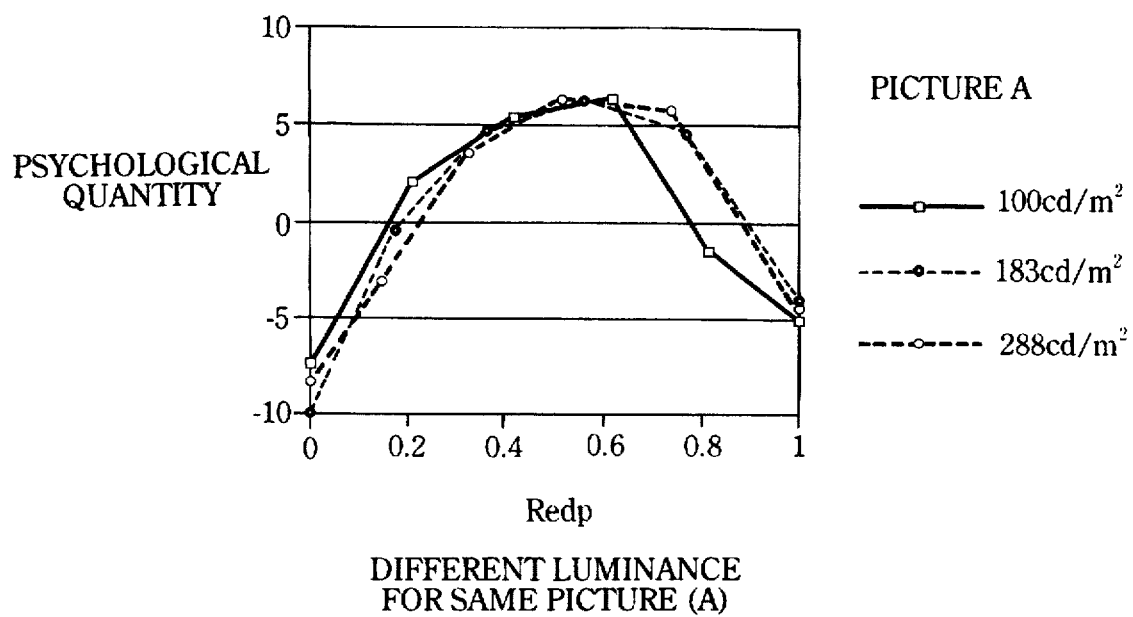
FIG. 10 illustrates the relation between an adaptive ratio coefficient and the psychological quantity of the viewer in case the CRT monitor is equal to the ambient light in luminance and the same picture has differing values of luminance.

FIGS. 8 to 10 have been prepared by the following procedure.

First, with the soft copy picture displayed on the CRT monitor 3 as the original picture, picture processing is performed by the picture processor 1 while the adaptation factor $R_{adp}$ to the CRT monitor 3 is sequentially changed in six stages of 0, 0.2, 0.4, 0.6, 0.8 and 1.0. The resulting data is printed as a hard copy picture on the printing sheet $P_{out}$ by the printer 4.

Of the six printing sheets $P_{out}$ carrying printed hard copy pictures associated with the six stages of the adaptation factors $R_{adp}$ (referred to hereinafter as printed pictures), two printed pictures are contrasted to each other as combination pairs and the printed picture closer to the soft copy picture as an original picture is selected for each combination pair. This method is refereed to hereinafter as a paired comparison method. The panelist comparing the hard copy picture and the printed picture is given time of several minutes for adaptation to lightness before actual comparison in order to become accustomed to the ambient light. The panelist sits about 50 to 60 cm away from the tube surface of the CRT monitor 3 and compares the soft-copy picture displayed on the CRT monitor 3 to the picture pair produced from the soft copy picture in order to give the above decision. This decision may be given by the panelist during the time for which no particular limitation is imposed. The panelist observes the paired printed pictures at a place at some distance from the CRT monitor 3.

The display size of the CRT monitor 3 is approximately 14 cm 9 cm. The soft copy pictures are displayed on the screen having white-colored bars about 5 mm in width on its four sides. If, in a soft copy picture, a soft copy picture is a picture of a human being, the background color is homogeneous gray, with a white batch being arrayed in the background as a partial reference point. A hard copy picture of substantially the same size as the soft copy picture is printed by the printer 4 on a white-colored printing sheet $P_{out}$.

The luminance of the ambient light (F6: 4150 K) of the ambient light is set to two levels of luminance different from the luminance of the CRT monitor 3. Using three different sorts of the pictures A, B and C having two sorts of images of different persons, the following paired comparison method is carried out for each luminance and the pictures A, B and C.

FIGS. 8 to 10 illustrate the results of the above decision by the above paired comparison method by plural observers, as converted into distance scale using statistic techniques.

Thus, FIG. 8 shows, for three sorts of pictures A, B and C with the reflection luminance of 183.4 cd/m$^2$ of the printing sheets $P_{out}$ on which has been printed the hard copy picture, luminance of 99.8 cd/m$^2$ of the CRT monitor 3 and with the color temperature of 9340 K of the white point of the CRT monitor 3, the relation between the adaptation factor $R_{adp}$ and the psychological quantity of the panelist specifying the degree of coincidence of color appearance between the soft copy picture and the printed picture.

FIG. 9 shows, for three sorts of pictures A, B and C with the reflection luminance of 287.8 cd/m$^2$ of the printing sheets $P_{out}$ on which has been printed the hard copy picture, luminance of 99.8 cd/m$^2$ of the CRT monitor 3 and with the color temperature of 9340 K of the white point of the CRT monitor 3, the relation between the adaptation factor $R_{adp}$ and the above-mentioned psychological quantity.

FIG. 10 shows, for the luminance of the ambient light equal to the luminance of the CRT monitor 3, and for three different stages of luminance levels of 100 cd/m$^2$, 183 cd/m$^2$ and 288 cd/m$^2$, in terms of the reflection luminance of the printing sheet on which has been printed the hard copy picture corresponding to the picture A.

In FIGS. 8 to 10, the adaptation factor $R_{adp}$ and the physico-psychological quantities converted into the distance measures are plotted on the abscissa and on the ordinate, respectively.

If, in FIGS. 8 and 9, the luminance of the ambient light differs from that of the CRT monitor 3, and the reflection luminance of the printing sheet $P_{out}$ is 183.4 cd/m$^2$ or 287.8 cd/m$^2$, it may be said to be most desirable to set the adaptation factor $R_{adp}$ with respect to the CRT monitor 3 to values in a range from 0.4 to 0.6, while it may be said to be most undesirable to set the adaptation factor $R_{adp}$ with respect to the CRT monitor 3 to values of 0.0 or 1.0. These results may be said to indicate flexibility in use since the colors within the gamut undergo only little fluctuations among the three pictures A, B and C. It is therefore preferred that the adaptation factor $R_{adp}$ with respect to the CRT monitor be set to a range from 0.4 to 0.6 without regard to the luminance level of the ambient light or picture types.

Referring to FIG. 10, in which the luminance level of the ambient light is equal to that of the CRT monitor 3, and the printing sheet $P_{out}$ exhibits three levels of reflection luminance, it may be said to be desirable that the value of adaptation factor $R_{adp}$ with respect to the CRT monitor 3 be set to values within a range from 0.4 to 0.6, as in the cases shown in FIGS. 8 and 9.

From what may be said n connection with FIGS. 8 to 10, a printed picture produced with the adaptation factor $R_{adp}$ of the equation 8 set to 0.4 to 0.6 can be sufficiently matched to the soft copy picture without regard to the luminance level of the ambient light. In particular, the printed picture obtained with the adaptation factor $R_{adp}$ set to 0.6 can be matched more satisfactorily with the soft copy picture.

With the above-described picture processing system 101, coincidence of the "color appearance" of the soft copy picture and that of the hard copy picture is achieved not only by colorimetric values such as CIE/XYZ or (CIE/L*a*b*) but also by contrast correction taking into account the reflected light from the tube surface of the CRT monitor 3 and correction of the Hunt effect and chromatic adaptation of the visual sense of the human being taking into account the different luminance level of the ambient light. The result is the high degree of coincidence of "color appearance" of the soft and hard copy pictures. In addition, since the a high degree of coincidence of "color appearance" between the soft and hard copy pictures may be achieved, the CRT monitor 3 displaying the soft copy picture may be used with advantage for proof correction purposes when outputting the hard copy picture in case of application of the picture processing system 101 to, for example, the DTP system, so that it becomes possible to save the labor of outputting a number of galley proofs by the printer 4.

If the CRT monitor 3 as an input device and the printer 4 as an output device are installed at physically remote places, the picture processor 1 may be separated into a transmission side including the input device and a reception side including the output device. In this case, the transmitting side may be comprised of the converter 11 and the optical environment conversion circuit 12, while the receiving side may be comprised of the optical environment conversion circuit 14 and the converter 15 and the L⁺M⁺S⁺ data outputted by the receiving-side optical environment conversion circuit 12 is received over a transmission channel by the receiving-side optical environment conversion circuit 14 for realizing the same "color appearance" on the transmitting and receiving sides. That is, the "color communication" which represents transmission of the information concerning the color may be realized correctly. The picture editing circuit 13 may be provided on the receiving side or on the transmitting side, as desired.

The picture processing system 101 includes the sensor $S_3$ for measuring the chromaticity of the white point of the printing sheet $P_{out}$. It is however also possible to provide a sensor $S_4$ comprised of a radiative color luminosity meter, as shown by a broken line in FIG. 6, in place of the sensor $S_3$. The sensor $S_4$ measures the chromaticity of the ambient light $L_4$ in the environment of viewing the hard copy picture printed on the printing sheet $P_{out}$ with the measured values of the chromaticity being sent as the optical environmental parameter to the optical environment conversion circuit 14. The optical environmental parameters supplied to the optical environment conversion circuit 14 represents the white point chromaticity $L_{n(HardCopy)}$, $M_{n(Hardcopy)}$ and $S_{n(HardCopy)}$ to which the visual sense of the viewer observing the hardcopy picture adapts itself.

Both the sensors $S_3$ and $S_4$ may be provided instead of providing one of these sensors. In this case, the white point chromaticity $L_{n(HardCopy)}$, $M_{n(HardCopy)}$ and $S_{n(HardCopy)}$, to which the visual sense of the viewer observing the hardcopy picture adapts itself, is determined taking into account the optical environmental parameters, outputted by the sensor $S_3$, and which are associated with the chromaticity of the white point of the printing sheet $P_{out}$ on which the printer 4 prints the picture, and the optical environmental parameters, outputted by the sensor $S_4$, and which are associated with the chromaticity of the ambient light $L_4$ in the environment in which the user observes the hard copy picture printed on the printing sheet $P_{out}$. Since this assures high-precision chromaticity $L_{n(HardCopy)}$, $M_{n(HardCopy)}$ and $S_{n(HardCopy)}$, it becomes possible to realize coincidence of "color appearance" between the soft and hard copy pictures to higher precision.

Figure 11:
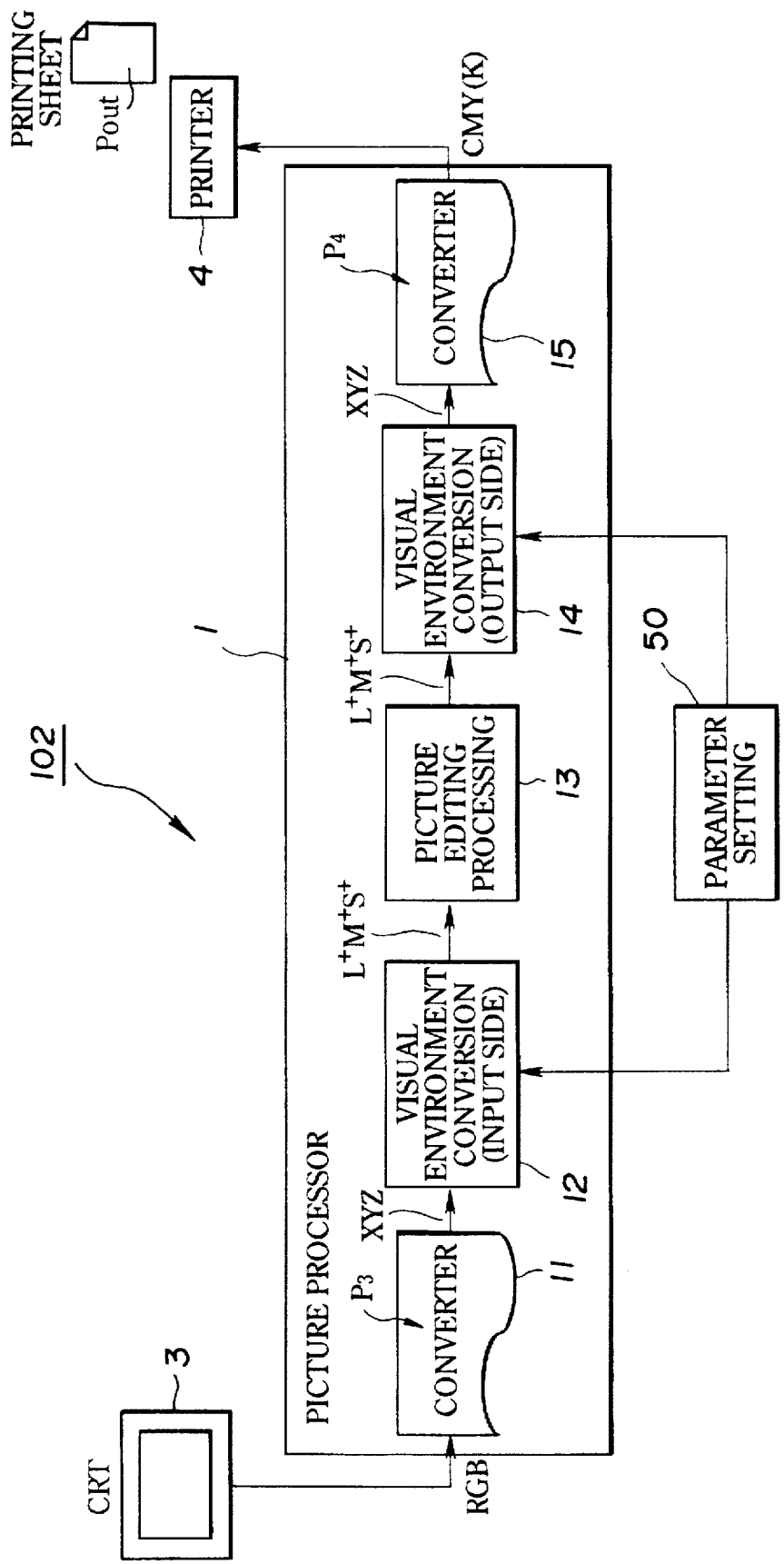
FIG. 11 is a block diagram showing an arrangement of the picture processing system in case provision is made of a parameter setting circuit.

The sensors $S_1$ to $S_3$ or $S_4$ may be replaced by a parameter setting circuit 50, as shown in FIG. 11.

The system of the configuration shown in FIG. 11 is termed a picture processing system 102, which is hereinafter explained.

In the picture processing system 102, shown in FIG. 11, the parts or components which are the same or similar to those of the picture processing system 101 shown in FIG. 6 are denoted by the same reference numerals and the detailed description therefor is omitted for simplicity.

In the present picture processing system 102, the parameter setting circuit 50 is provided in place of the sensors $S_1$ to $S_3$ or $S_4$, as pointed out above.

The parameter setting circuit 50 is designed so that it is acted on by an operator for setting the optical environmental parameters derived from actuation on the optical environment conversion circuit 12 and on the optical environment conversion circuit 14.

Figure 12:
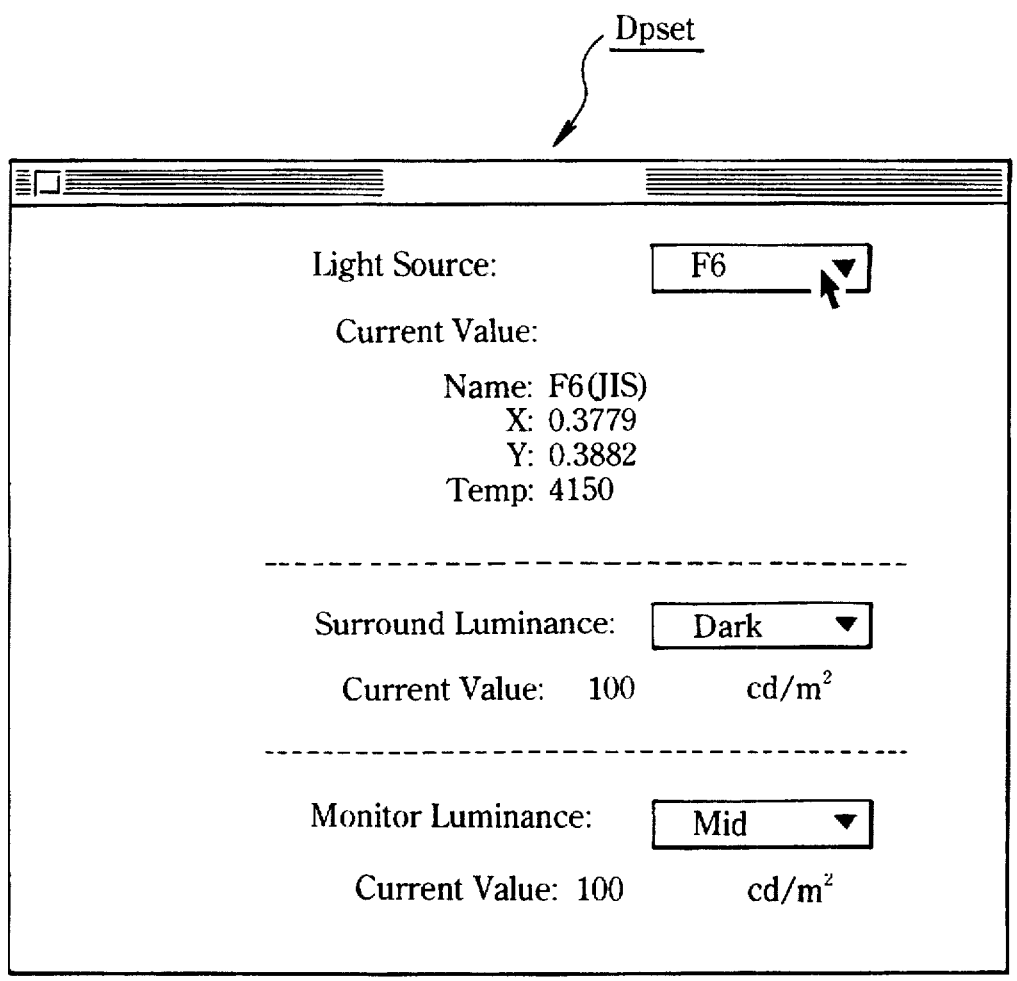
FIG. 12 illustrates a parameter setting screen.

By operating the parameter setting circuit 50 without providing the sensors $S_1$ to $S_3$ or $S_4$ for measuring the optical environment, and by setting the optical environmental parameters in this manner in the optical environment conversion circuit 12 and in the optical environment conversion circuit 14, the system can be constructed less expensively In the picture processing system 102, the optical environmental parameters are set by acting on the parameter setting circuit 50. Alternatively, various variables of the optical environment may be entered from the operating screen $D_{pser}$, shown in FIG. 12, using a computer shown for example n FIG. 5.

Specifically, chromaticity of a room light (Light Source), luminance of the room light (Surround Luminance) and luminance of the CRT monitor 3 (monitor Luminance) may be entered from the operating screen $D_{pser}$. The chromaticity of the room light has many alternatives, such as "fluorescent lamp", "incandescent lamp", "D65", "D50", . . . . Similarly, the luminance of the room light has many alternatives, such as "light", "medium", "dark", . . . while that of the CRT monitor 3 also has many alternatives such as "light", "medium", "dark", . . . . . Moreover, in the optical environmental parameters corresponding to the above-mentioned plural alternatives are stored in the parameter setting circuit 50.

The user then selects the alternative associated with the environment in which the picture processing system 102 is installed, and enters the selected alternative on the operating screen $D_{pset}$. In FIG. 8, the chromaticity of the room light of "F6", the luminance of the room light of "dark", the luminance of the room light of "dark" and the luminance of the CRT monitor 3 of "medium" have been selected and entered.

The parameter setting circuit 50 sets the optical environmental parameters associated with the alternative entered from the operating screen $D_{pset}$ in the optical environment conversion circuit 12 and in the optical environment conversion circuit 14.

By setting the optical environmental parameters from the operating screen $D_{pset}$, the user can set the optical environmental parameters matching the environment of the picture processing system 102 easily for the system.

In the picture processing systems 100, 101, 102 shown in FIGS. 5, 6 and 7, respectively, the CRT monitor 3 and the printer 4 are the input and output devices, respectively. However, the scanner 2 and the CRT monitor 3 may also be the input device and the output device, respectively.

Figure 13:
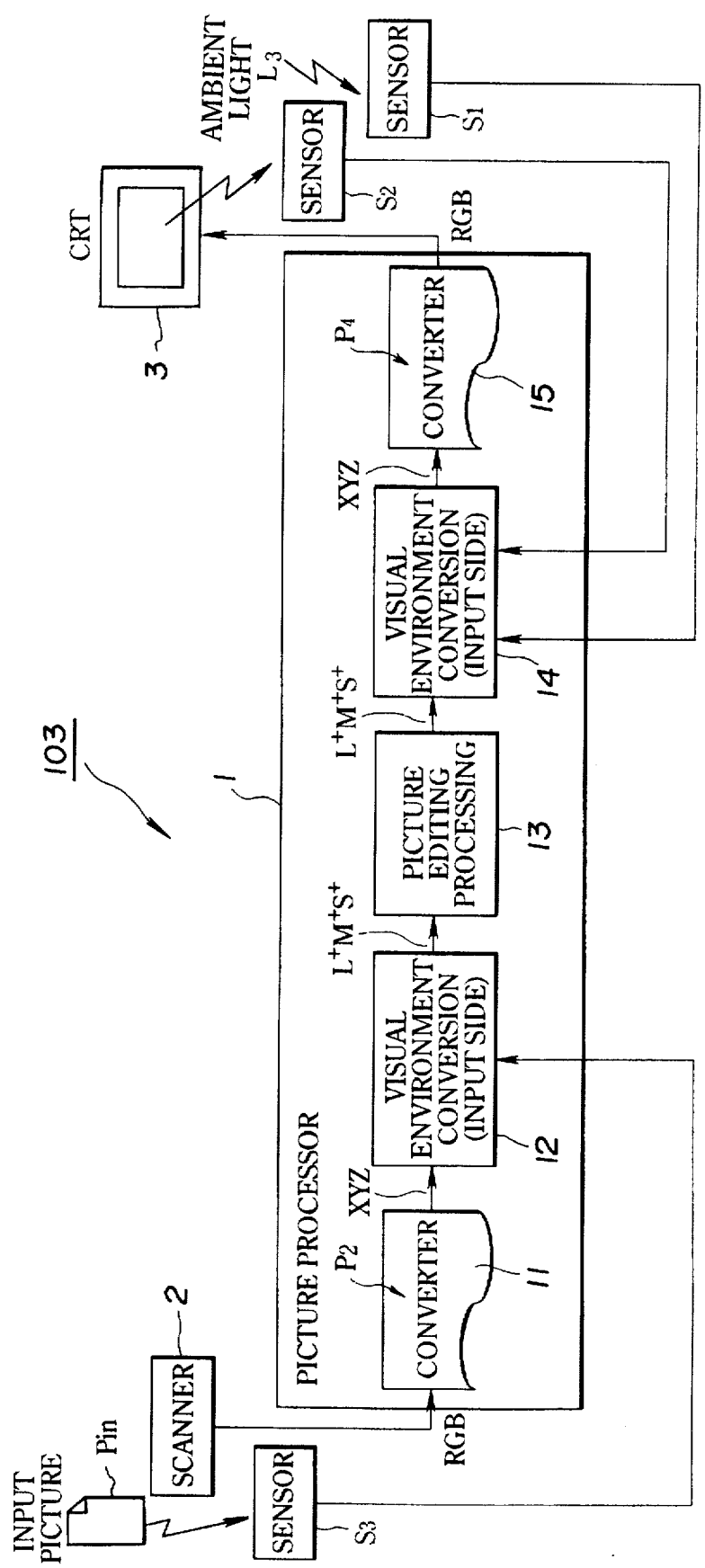
FIG. 13 is an arrangement of the picture processing system shown in FIG. 5, in which a scanner is an input device and a CRT monitor is an output device.

FIG. 13 specifically shows an arrangement of the picture processing system 100 in which the scanner 2 is an input device and the CRT monitor 3 is an output device.

The system shown in FIG. 13 is termed a picture processing system 103, which is hereinafter explained.

In the picture processing system 103 shown in FIG. 13, the parts or components having the same operation as that of the picture processing system 101 shown in FIG. 6 are denoted by the same reference numerals and are not described in detail.

In the present picture processing system 103, the sensor $S_3$ measures the chromaticity at the white points of the printing sheet $P_{in}$ having printed thereon the hard copy picture previously seized by the scanner 2, and routes the measured chromaticity values as the optical environmental parameters to the optical environment conversion circuit 12. Simultaneously, the sensor $S_1$ outputs the optical environmental parameters matching the chromaticity of the ambient light of the environment of the CRT monitor 3, while the sensor $S_2$ outputs the optical environmental parameters matching the chromaticity and the absolute luminance of the white point of the CRT monitor 3, as in the case of the picture processing system. The respective optical environmental parameters are supplied to the optical environment conversion circuit 14.

The converter 11 has the profile $P_2$ for the scanner 2 stored therein, while the converter 15 has the profile $P_3$ for the CRT monitor 3 stored therein.

Thus the optical environment conversion circuit 12 is responsive to the optical environmental parameters from the sensor $S_3$ to perform calculations corresponding to the equation (16), modified into the equation concerning $L^+$, $M^+$, $S^+$, on the XYZ data from the converter 11, in order to find the $L^+$, $M^+$, $S^+$ data (L, M and S).

In the above-described picture processing systems 101, 102 and 103, the combination of the CRT monitor 3 and the printer 4 or the combination of the scanner 2 and the CRT monitor 3 is used as the combination of the input and output devices. These combinations are merely exemplary and the combination of the input device and the output device, at least one of which emits light for itself to display the picture, such as the combination of the video camera and the CRT monitor 3 or the combination of two monitors emitting light for itself for displaying the soft copy picture, may be employed. It is also possible for both the input and output devices to handle the image without self-emitting the light.

In addition, a number of output devices may also be provided in lace of only one output device.

I claim:

1. A method for processing picture data between an input device and an output device both handling pictures, said picture data being transmitted from the input device to the output device, wherein, responsive to the luminance of the ambient light for observing the picture handled by the input device, the picture data corresponding to the picture handled by the input device is converted into index data for color appearance matching the color appearance under the ambient light, by way of performing a first conversion operation, and wherein, responsive to the luminance of the ambient light for viewing the picture handled by the output device, said index data for color appearance is converted so that the color appearance under said ambient light will be coincident with the color appearance under the ambient light for viewing the picture handled by the input device, by way of performing a second conversion operation.

2. The picture processing method as claimed in claim 1 wherein at least one of the input device and the output device self-emits the light for a soft copy picture and outputs the soft copy picture.

3. The picture processing method as claimed in claim 2 wherein said first conversion is correction of the contrast of the soft copy picture responsive to the reflection of the ambient light by the soft copy picture.

4. The picture processing method as claimed in claim 1 wherein said first conversion is correction for chromatic adaptation of the visual sense of the human being by weighting responsive to the luminance of the ambient light.

5. The picture processing method as claimed in claim 1 wherein said first conversion is correction for the Hunt effect.

6. An apparatus for processing picture data between an input device and an output device both handling pictures, said picture data being transmitted from the input device to the output device, comprising: first conversion means for converting the picture data corresponding to the picture handled by the input device into index data for color appearance matching the color appearance under the ambient light responsive to optical environmental parameters specifying luminance of the ambient light in which to observe the picture handled by said input device; and second conversion means for converting said index data for color appearance obtained by said first conversion means responsive to the luminance of the ambient light for viewing the picture handled by the output device, so that the color appearance under said ambient light will be coincident with the color appearance under the ambient light for viewing the picture handled by the input device.

7. The picture processing apparatus as claimed in claim 6 wherein at least one of the input device and the output device self-emits the light for a soft copy picture and outputs the soft copy picture.

8. The picture processing apparatus as claimed in claim 7 wherein said first conversion is correction of the contrast of the soft copy picture responsive to reflection of the ambient light by the soft copy picture.

9. The picture processing apparatus as claimed in claim 6 wherein said first conversion is correction for chromatic adaptation of the visual sense of the human being by weighting responsive to the luminance of the ambient light.

10. The picture processing apparatus as claimed in claim 6 wherein said first conversion is correction for the Hunt effect.

* * * * *